Feb. 28, 1928.

J. W. STOLLE 1,661,017

DRILLING MACHINE

Filed April 2, 1924

J. W. Stolle
INVENTOR

BY
ATTORNEYS

Feb. 28, 1928.                    1,661,017
J. W. STOLLE
DRILLING MACHINE
Filed April 2, 1924          3 Sheets-Sheet 2
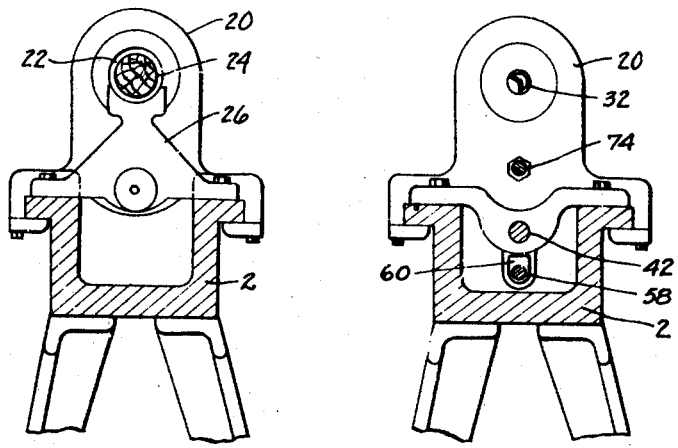
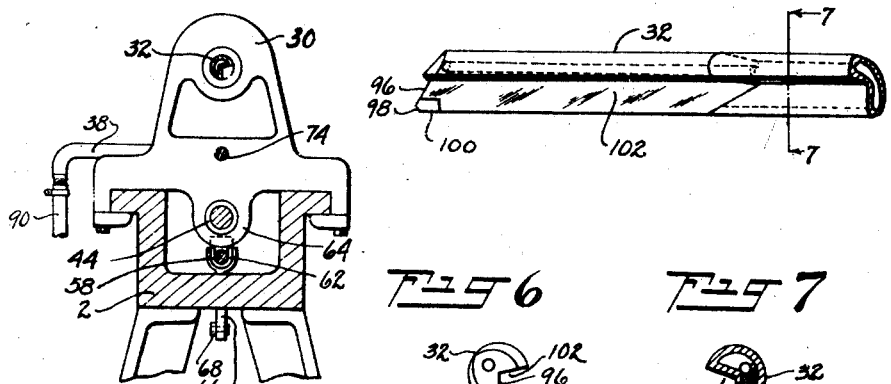
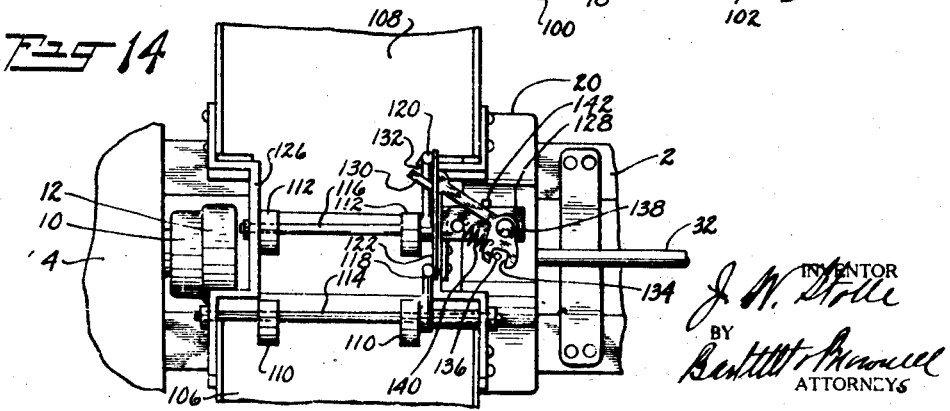

Feb. 28, 1928.
J. W. STOLLE
1,661,017
DRILLING MACHINE
Filed April 2, 1924      3 Sheets-Sheet 3
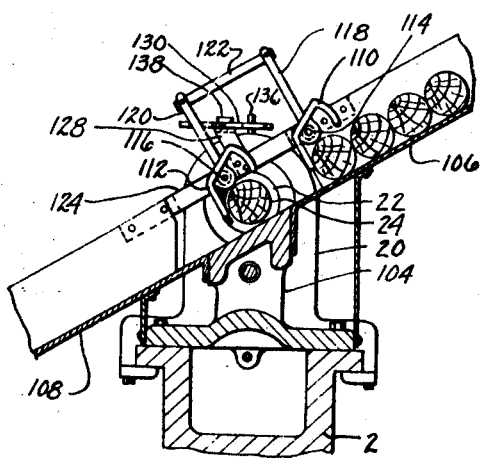
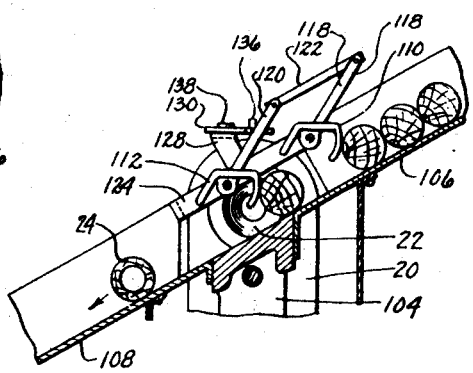
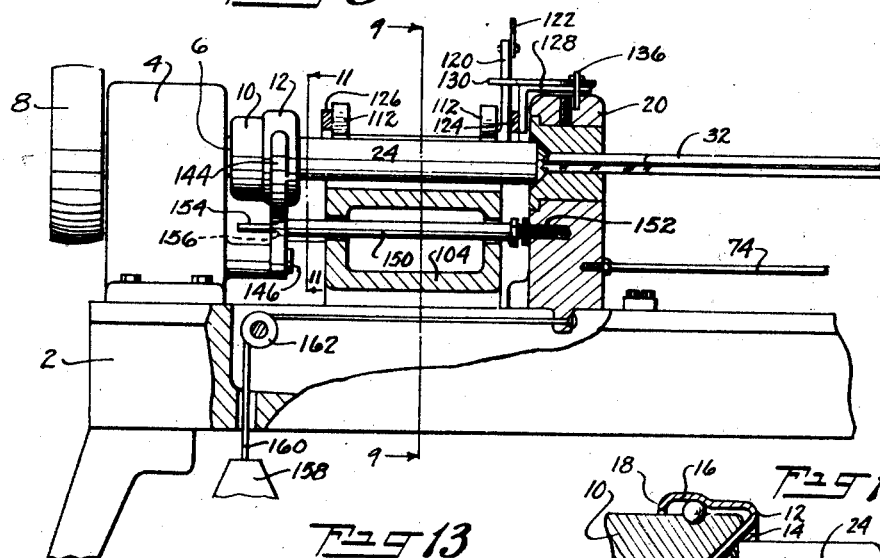
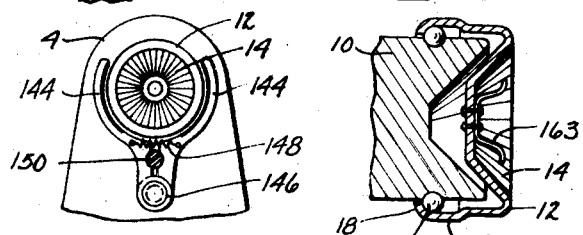
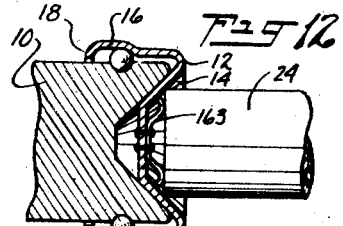
INVENTOR
John W. Stolle
BY
ATTORNEYS Patented Feb. 28, 1928.

1,661,017

UNITED STATES PATENT OFFICE.

JOHN WILLIAM STOLLE, OF DANBURY, CONNECTICUT, ASSIGNOR TO THE DANBURY UNBREAKABLE TOOL CORPORATION, OF DANBURY, CONNECTICUT, A CORPORATION OF CONNECTICUT.

DRILLING MACHINE.

Application filed April 2, 1924. Serial No. 703,624.

My invention relates to drilling machines and has for its object to provide a new and improved machine for drilling wood in which the operation is automatic after the wood is supplied to the machine. It further has for its object to provide such a machine in which the wood to be drilled is automatically supplied thereto. It further has for its object to produce a machine which is simple in construction and rapid in operation. It further has for its object to provide a machine with means for expediting its operation and providing against accidents to the machine and to the attendant thereof.

The following is a description of an embodiment of my invention, reference being had to the accompanying drawings, in which, Fig. 1 shows a longitudinal view, partly in section, of a machine which is automatic as to certain of its operations;

Fig. 2 is a section of the same on the line 2—2, Fig. 1;

Fig. 3 is a section on the line 3—3, Fig. 1;

Fig. 4 is a section on the line 4—4, Fig. 1;

Fig. 5 is an enlarged detail view of the end portion of the drill used in my machine;

Fig. 6 is an end view of the drill;

Fig. 7 is a section on the line 7—7, Fig. 5;

Fig. 8 shows the machine of Fig. 1 equipped with means for automatically feeding the wood thereto to be drilled;

Fig. 9 is a section on the line 9—9, Fig. 8;

Fig. 10 shows a sectional view of portions shown in Fig. 9 in a different actuated position;

Fig. 11 is a section on the line 11—11, Fig. 8;

Fig. 12 is a section of the driving chuck with the parts in operative position when a piece of wood is being drilled;

Fig. 13 is a similar sectional view of the chuck when the wood is removed; and

Fig. 14 is a plan view of the feeding means for supplying pieces of wood to be drilled one at a time and discharging the same.

Figure 1:
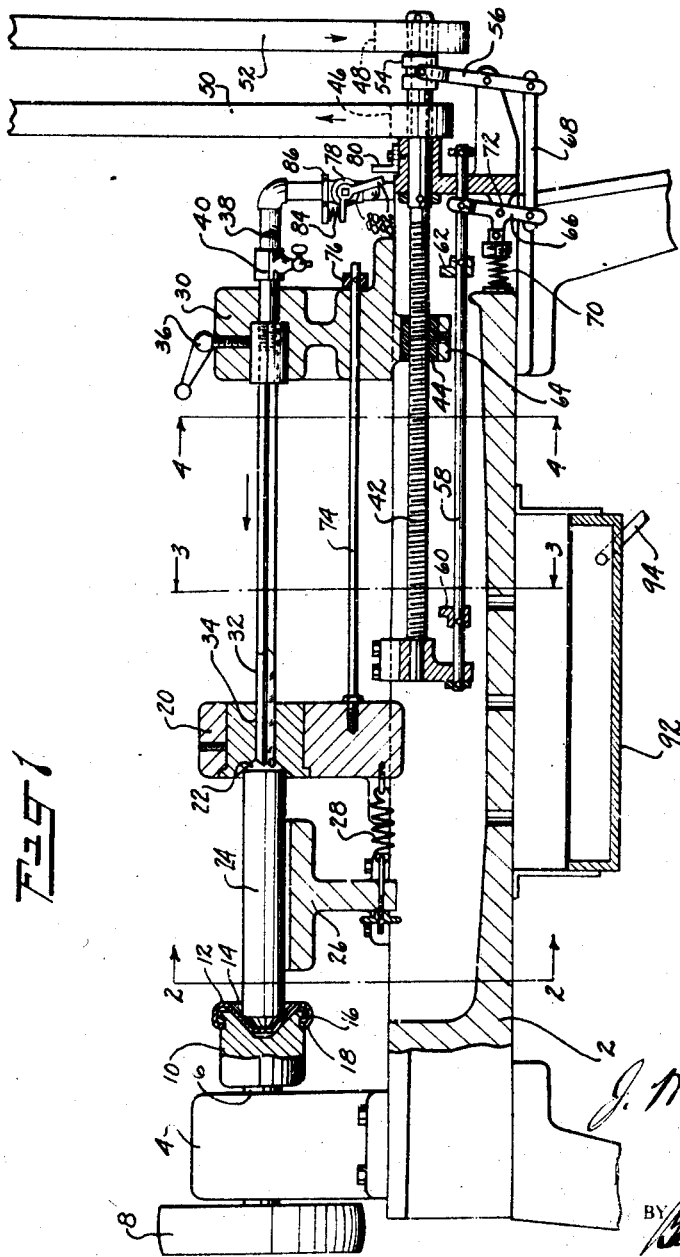

Referring more particularly to the drawings 2 is a bed of the drilling machine having thereon a head-stock 4 provided with a rotatable shaft 6 driven by a pulley 8 and provided with a chuck for holding the wood. This chuck consists of a base member 10 and a face member 12, the face member having a conical block receiving recess provided with ribs 14. The chuck base is provided with a projection 16 behind which lies the flange 18 of the movable face member 12, this flange and projection being so related that the movable face is free to move slightly axially relatively to the base. The purpose of this construction is to provide a face member which can be stopped and held from rotation while the base member 10 is continuing to revolve. This enables the block of wood to be drilled to be easily inserted and removed without slowing down the driving pulley 8.

20 is a support slidingly mounted upon the base and provided with a conical recess 22 constituting a centering bearing whose axis is in line with the axis of the centering conical recess 14 and the axis of the shaft 6, these two conical recesses 14 and 22 acting to center a piece of wood 24 clamped between them. 26 is a support or cradle to which blocks of wood, such as 24 are supplied one at a time. This support 26 holds the block of wood in such position that when the sliding support 20 is moved toward the chuck member the conical recesses in the support 20 and chuck member will engage the ends of the block of wood and automatically lift and center it so that its axis is in line with the axis of the shaft 6. A spring 28 adjustably secured to the stationary support 26 is connected to the support 20 and when the support 20 is retracted tends to move and when free to do so does move it toward the chuck so as to cause it to lift the block of wood 24 from the support 26 and center it, as above described. The spring 28 can be adjusted so as to produce the desired clamping action.

30 is a sliding tail-stock which carries a drill 32, the forward end of which fits within the guide opening 34 of the support 20. This drill has a butt end which is held within the tail-stock 30 by a set screw 36 and is thereby held against rotation. The drill 32 has a passage extending from end to end through which water or other fluid can be passed from the supply pipe 38, which pipe is provided with a vent cock 40, if desired.

The tail-stock 30 is automatically retracted and propelled by a screw 42 mounted in suitable bearings and engaging a nut 44 carried by a portion projecting downwardly from the tail-stock 30. As the screw 42 is revolved first in one direction and then in the other, the tail-stock 30 is retracted and propelled.

In order to revolve the screw 42 and reverse the same periodically, I provide thereon two loose driving pulleys 46 and 48 simultaneously driven in opposite directions by belts 50 and 52. If the belts are driven at the same speed the pulley 48 which causes the screw 42 to revolve so as to make the tail-stock 30 move to the left is preferably the larger, with the result that the forward working movement of the drill is slower than the retracting movement. The pulleys 46 and 48 are loosely mounted upon the shaft 42 and are alternately connected thereto by the ordinary sleeve clutch 54 splined upon the shaft of the screw 42 and provided with a shifting yoke 56. This shifting yoke is operated by a rod 58 having thereon adjustable abutments 60 and 62 which are alternately engaged by the projection 64 carrying the nut 44. This rod is connected by a lever 66 to a link 68 which is pivotally connected to the lower end of the shifting lever or yoke 56. The position of the rock shaft 66 is controlled by a spring 70 pivotally connected thereto, the pivot point being located so that as the rock lever is shifted from one position to the other the pivotal connection of the spring lies first on one side and then on the other side of the dead center of the pivot 72.

In order that the support 20 may be automatically retracted I provide a rod 74 secured thereto and having upon its end an adjustable abutment 76. This rod passes through the tail-stock 30 and is engaged by that support during the latter part of the period of the backward movement of the tail-stock 30 so that during that period the support 20 will be retracted, thus releasing the block 24. After the tail-stock 30 is moved forward to the position shown in Fig. 1 the support 20 will have been moved forward by the action of the spring 28 so as to clamp the block 24 as before described.

In the pipe 38 supplying liquid, I provide a valve 78 which is actuated by an adjustable stop 80. This valve is actuated by the engagement of the crank 82 connected to the plug of the valve 78 with the stop 80 which moves the plug to closed position, and by the action of a spring 84 located between an extension on said arm and an abutment 86 carried by the valve casing. The stop 80 closes the valve during the latter part of the backward movement of the tail-stock 30 and preferably before the support 20 has been retracted. The disengagement of the arm 82 from the stop 80 permits the spring 84 to open the valve, moving the arm 82 until it engages the stop 88, the adjustment preferably being such that the valve is opened after the support 20 has fully moved forward to block clamping position. By adjusting the arm 82 or stop 80 the opening and closing of the valve may be accomplished when the point of the drill is at or just inside the rear end of the block 24. The result is that the supply of water to the drill 32 is cut off at all times except when a piece of wood is clamped in drilling position. One part of the valve 78 is connected to a pipe which will not interfere with the movements of the tail-stock 30, such for instance as a rubber hose 90 leading to a source of water under pressure (not shown). When the hose 90 is connected to the inlet of the valve 78 I mount the valve on the tailstock 30 and make the stop 80 stationary, as shown. That is the preferred arrangement. I preferably use a pressure of from 350 to 700 pounds per square inch, which may be simple hydraulic pressure, or may be supplied by a suitable pump of any well known construction provided that a safety by-pass, which will permit the pump to operate when the valve 78 is closed, is used, such pumps being well known. 92 is a tank for receiving water during the drilling operation and when a pump is used the suction 94 of the pump takes the water from this tank so that the water may be used over and over again. I prefer to use water which is somewhat soapy.

With this apparatus all the attendant has to do is to supply blocks of wood 24 to the support 26 and remove them therefrom. The machine is rapid and positive in its action.

The drill is similar to that described in my copending application Ser. No. 694,521, filed February 23, 1924 and when operated as described will drill a straight hole in a piece of wood in a remarkable manner.

The drill is provided with cutting faces 96 and 98 and its edge 100 is sharpened so as to produce a shaving reaming action which is of great importance in enabling the drill to drill a straight hole. The face of the drill is slanted back. The drill is provided with a channel 102 which extends backward so as to always end to the right of the support 20 through which channel the water supplied to the drill discharges carrying the cuttings with it.

In order to supply the pieces of wood to be drilled automatically I provide a support 104 carried by the bed of the machine which carries a supply chute 106 and a discharge chute 108. I also provide two pairs of escapement members 110 and 112, each pair fixedly mounted upon shafts 114 and 116, respectively. To the ends of these shafts are connected crank arms 118 and 120 which are connected together by a link 122. The shafts 114 and 116 are journaled in brackets 124 and 126 secured to the base of the machine. Mounted upon an extension 128 from the bracket 124 is a bell crank 130 having a fork 132 which embraces the arm 120 of the other arm of the bell crank having a slot or recess 134 in which plays a pin 136 projecting from the upper portion of the sliding support 20. The bell crank is pivoted at 138.

The spring 140 tends to move the bell crank clockwise and this movement is arrested by a stop 142.

The result of this construction is that when the support 20 is in forward clamping position, the escapements 110 and 112 are in the position shown in Fig. 9 in which case the escapement 112 cooperates with the support 104 to form a cradle for a piece of wood about to be drilled. When, however, the support 20 is retracted the bell crank 130 moves the escapements into the position shown in Fig. 10 raising the front teeth so as to discharge the block which has just been drilled and permitting another block to escape from the front teeth of the escapement 110 and be arrested by the back teeth of the escapement 112. The back teeth of the escapement 110 simultaneously engages a rear block. When the support 20 again moves forward the escapements are restored to the position shown in Fig. 9 permitting the blocks which were in engagement with the back teeth thereof to assume the positions shown in Fig. 9 in contact with the front teeth. The elongated opening 134 in the bell crank permits a slight movement of the support 20 sufficient to release the block 24 before the escapements 110 and 112 are actuated, that is, the escapements are moved into the position shown in Fig. 10, during the latter part of the backward stroke of the support 20. On account of the spring 140, however, they are moved into the position shown in Fig. 9 during the first part of the return movement of the support 20 so that new blocks are brought into engagement with the front teeth and a new block is located in front of the conical recesses of the bearing and chuck before it is engaged by the conical surfaces thereof. When the block, so positioned, is engaged by the conical surfaces of the support 20 and the driving chuck it is automatically lifted from the cradle and centered between them in line with the axis of the drill and shaft 6 and lifted up so as to be slightly removed from the upper surface of the support 104 as shown in Fig. 9.

In order to insure safety for the machine and for the attendant, the shaft of the machine being driven at high speed, say 1800 to 2500 R. P. M., I provide an automatic brake for the separable face 12 of the chuck, the same consisting of a pair of brake shoes 144 pivoted to the head stock at 146 and drawn together by a spring 148. These brake shoes embrace the sides of the movable chuck face 12 and whenever the support 20 is retracted cause a braking effect with relation thereto so as to hold the movable face 12 from turning when the chuck base is revolved. In order to automatically remove this braking effect I provide an actuating rod 150 adjustably mounted at 152 in the support 20. This rod is provided with a portion 154 of uniform diameter and with cam shoulders 156 which cam shoulders engage similar cooperating surfaces upon the arms of the brake shoes 144 just before the support 20 completes its movement to the left, so that just before a block 24 is clamped between the conical faces of the support 20 and the rotating chuck the braking effect upon the movable face 12 is removed. In the machine shown in Fig. 8 the projection which is engaged by the flange 18 of the face member 12 is formed of balls 155 cooperating with suitable raceways so as to form a ball-bearing connection.

In the machine shown in Fig. 8 I have shown an adjustable weight 158 connected by a cable 160 extending over the pulley 162 to the movable support 20, the same being the well known equivalent of the adjustable spring shown in Fig. 1.

163 is a doffing spring which ejects the block 24 from the chuck face 12 when the support 20 is retracted.

In operating the machine the shaft 6 is driven at a high rate of speed such as 1800 to 2500 R. P. M. and the screw 42 is driven in its forward feeding movement at such a rate as to cause the tail-stock 30 to move rapidly. This movement may be at the rate of a foot in five seconds. If the machine is to be supplied with material manually the attendant when the tail-stock and drill are in retracted position lays a block of wood upon the cradle 26. The drill is then fed forward permitting the support 20 to move forward and clamp the block 24 against the chuck face 12 under the desired clamping pressure, thus acting to automatically raise the block 24 out of contact with the support 26 and aline its axis with the drill. The chuck driven by the pulley 8 then causes the block 24 to revolve rapidly. Simultaneously with the clamping action the valve 78 is opened permitting water to be discharged at the point of the drill and thereupon the drill continuing to move forward enters the block, drilling the hole and discharging the cuttings through the channel 102. When the drill has penetrated completely through the wood or to the desired depth the stop 60, being suitably adjusted, is engaged by the projection 44 and the rotation of the screw 42 is thereupon reversed causing the drill to be drawn outward. When the tail-stock carrying the drill approaches the end of its backward movement it engages the abutment 76 and thus retracts the support 20 slightly permitting the block 24 to drop down upon the support 26 and causing the valve 78 to be actuated by the stop 80 so as to be closed and cut off the supply of water to the drill.

With this simple form of mechanism high speed of operation may be maintained.

The operation of the machine shown in Fig. 8 is the same as that shown in Fig. 1 with the addition that when the support 20 begins to be retracted the movable face 12 is automatically stopped by the brake shoes 144, above described, this being controlled by a rod 150 and that the blocks to be drilled are automatically supplied and discharged by the chutes 106 and 108 and the detents 110 and 112, the construction and operation of which has been heretofore described. The rear teeth of the escapements act as pushers upon the blocks immediately ahead of them to aid in discharging such blocks when the front teeth are lifted. This automatic feed permits more continuous work and a higher speed with less supervision.

The drill 32 which I have shown is exaggerated in diameter for clearness of illustration. My invention is a great value in drilling relatively long holes with drills three eighths in diameter and even smaller. The drills obviously can be of larger diameter.

As will be evident to those skilled in the art, my invention permits of various modifications without departing from the spirit thereof or the scope of the appended claims.

What I claim is:

1. In a drilling machine, the combination of a fixed head stock, a rotatable chuck carried thereby, a longitudinally movable tail stock and drill fixed therein, a movable support having a work-supporting bearing facing said chuck and located between said chuck and tail stock, means for automatically reciprocating said tail stock, a lost motion connection between said tail stock and support whereby said tail stock, during the latter part of its rearward movement, moves said support in the same rearward direction, and means tending to move said support toward said head stock, said means being released by said tail stock during the first portion of its forward movement and permitting said support to be retracted by said tail stock during the latter part of the retracting movement of said tail stock.

2. In a drilling machine, the combination of a head stock, a rotatable chuck carried thereby, a tail stock, a drill fixed therein, a movable support having a work supporting bearing facing said chuck, means for reciprocating said tail stock, a lost motion connection between said tail stock and support, means tending to move said support toward said head stock, a cradle between said head stock and support, said cradle comprising escapement means adapted to feed the articles to be drilled, and means actuated by said support for actuating said escapements.

3. In a drilling machine, the combination of a head stock, a rotatable chuck carried thereby, a tail stock, a hollow drill fixed therein, a movable support having a work supporting bearing facing said chuck, means for reciprocating said tail stock, a lost motion connection between said tail stock and support, means tending to move said support toward said head stock, means for supplying fluid to said hollow drill, and means for automatically cutting off said fluid supply during the backward movement of said tail stock.

4. In a drilling machine, the combination of a head stock, a rotatable chuck carried thereby, a tail stock, a hollow drill fixed therein, a movable support having a work supporting bearing facing said chuck, means for reciprocating said tail stock, a lost motion connection between said tail stock and support, means tending to move said support toward said head stock, means for supplying fluid to said hollow drill, and means actuated by said tail stock for cutting off the supply of fluid during the backward movement of said tail stock.

5. In a drilling machine, the combination of a head stock, a rotatable chuck carried thereby, a tail stock, a hollow drill fixed therein, a movable support having a work supporting bearing facing said chuck, means for reciprocating said tail stock, a lost motion connection between said tail stock and support, means tending to move said support toward said head stock, means for supplying fluid to said hollow drill, and means actuated by said tail stock for cutting off the supply of fluid during the backward movement of said tail stock the lost motion connection between said tail-stock and support being such that the fluid is cut off whenever said bearing support is retracted.

6. In a drill, a head stock, a rotatable chuck carried thereby comprising a base portion and a work-engaging face portion adapted to frictionally engage and disengage said base portion so as to be alternately driven thereby and free to rotate continuously relatively thereto, and a brake adapted to engage said face portion for stopping the same when out of driving engagement with said base portion.

7. In a drill, a head stock, a rotatable chuck carried thereby comprising a base portion and a work-engaging face portion adapted to frictionally engage and disengage said base portion so as to be alternately driven thereby and free to rotate continuously relatively thereto, and a brake adapted to engage said face portion for stopping the same when out of driving engagement with said base portion, a work-supporting bearing, a reciprocable bearing support, and means carried by said support for controlling the application and release of said brake.

8. In a drill, a head stock, a rotatable chuck carried thereby comprising a base portion and a work-engaging face portion adapted to frictionally engage and disengage said base portion so as to be alternately driven thereby and free to rotate continuously relatively thereto, and a brake adapted to engage said face portion for stopping the same when out of driving engagement with said base portion, a work-supporting bearing, a reciprocable bearing support, a reciprocable tail stock, a drill carried thereby, and means connected to said tail stock for controlling the application and release of said brake.

9. In a drilling machine, the combination of a head stock, a rotatable chuck carried thereby, a tail stock, a hollow drill fixed therein, a movable support having a work supporting bearing facing said chuck, means for reciprocating said tail stock, a lost motion connection between said tail stock and support, means tending to move said support toward said head stock, means for supplying fluid to said hollow drill, means for automatically cutting off said fluid supply prior to the backward movement of said support and restoring it after the forward movement of said support.

10. In a drilling machine, the combination of a head stock, a rotatable chuck carried thereby, a tail stock, a hollow drill fixed therein, a movable support having a work supporting bearing facing said chuck, means for reciprocating said tail stock, a lost motion connection between said tail stock and support, and means tending to move said support toward said head stock, means for supplying fluid to said hollow drill, and means controlled by said tail stock for cutting off the fluid supply during the latter part of the backward movement of said tail stock and restoring it during the early part of the forward movement thereof.

11. In a drilling machine, the combination of a head stock, a rotatable chuck carried thereby, a tail stock, a hollow drill fixed therein, a movable support having a work supporting bearing facing said chuck, means for reciprocating said tail stock, a lost motion connection between said tail stock and support, means tending to move said support toward said head stock, means for supplying fluid to said tail stock and drill, a valve carried by said tail stock for controlling said fluid supply, said valve tending to open, and a stationary abutment engaged by said valve during the latter part of its backward movement and acting to close the same through such engagement.

12. In a drilling machine, the combination of a stationary head stock, a rotatable chuck carried thereby, a movable tail stock and drill fixed therein, a movable support having a work-supporting bearing facing said chuck and located between said chuck and said tail stock, means for automatically reciprocating said tail stock, a lost motion connection linking said tail stock and support together whereby said tail stock, during the latter part of its rearward movement, moves said support in the same rearward direction, means tending to move said support toward said head stock, said means being released by said tail stock during the first portion of its forward movement and permitting said support to be retracted by said tail stock during the latter part of the retracting movement of said tail stock, and a cradle between said tail stock and support, said chuck and bearing having opposing conical faces extending below the bottom of said cradle and whose axes are in line with the axis of rotation of said chuck.

13. In a drill, a head stock, a rotatable chuck carried thereby comprising a base portion and a work-engaging face portion adapted to frictionally engage and disengage said base portion so as to be alternately driven thereby and free to rotate continuously relatively thereto, and a brake adapted to engage said face portion for stopping the same when out of driving engagement with said base portion, a work-supporting bearing, a reciprocable bearing support, a reciprocable tail stock, a drill carried thereby, means connected to said tail stock for controlling the application and release of said brake, and an ejecting spring carried by said face portion.

14. In a drilling machine, the combination of a rotatable chuck, a drill support, a drill fixed therein, means for reciprocating said drill support, a work engaging bearing opposed to said chuck, a support therefor, means for automatically withdrawing and propelling said bearing support in timed relation to said drill support so that said bearing support is propelled to clamping position before the drill enters the article to be drilled and is retracted after the drill is withdrawn from said article when drilled, means for feeding fluid through said drill, and means for automatically cutting off the fluid supply during the period of backward movement of said drill and restoring it during the early portion of the forward movement of said drill.

15. In a drilling machine, the combination of a rotatable chuck, a drill support, a drill fixed therein, means for reciprocating said drill support, a bearing support opposed to said chuck and means for automatically withdrawing and propelling said bearing support in timed relation to said drill support so that said bearing support is propelled to clamping position before the drill enters the article to be drilled and is retracted after the drill is withdrawn from said article when drilled, and means controlled by said bearing support and actuated by said tail-stock for automatically feeding to said machine articles to be drilled.

16. In a drilling machine, the combination of a reciprocating drill support, a hollow drill carried thereby, a reciprocating bearing support, a rotatable chuck co-operating therewith, means for supplying fluid to said hollow drill through said drill support, a valve controlling said fluid supply, means controlling the opening and closing of said valve, one of the two last mentioned elements being stationary and the other being carried by one of said supports and moving therewith so that said valve is closed when said last mentioned support is retracted and opened when that support is moved forward a predetermined amount.

17. In a drilling machine, the combination of a reciprocating drill support, a hollow drill carried thereby, a reciprocating bearing support, a rotatable chuck co-operating therewith, means for supplying fluid to said hollow drill through said drill support, a valve controlling said fluid supply, means for controlling the opening and closing of said valve, one of said last mentioned elements being stationary and the other being carried by said drill support and moving therewith so that said valve is closed when said drill support is retracted and opened when said drill support is moved forward a predetermined amount.

JOHN WILLIAM STOLLE.